(12) United States Patent
Velummylum et al.

(10) Patent No.: US 9,189,484 B1
(45) Date of Patent: Nov. 17, 2015

(54) AUTOMATIC TRANSCODING OF A FILE UPLOADED TO A REMOTE STORAGE SYSTEM

(75) Inventors: Piragash Velummylum, Seattle, WA (US); Bradley E. Marshall, Bainbridge Island, WA (US); Jacob Gabrielson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 15 days.

(21) Appl. No.: 13/403,928

(22) Filed: Feb. 23, 2012

(51) Int. Cl.
*G06F 17/30* (2006.01)

(52) U.S. Cl.
CPC ................. *G06F 17/30067* (2013.01)

(58) Field of Classification Search
CPC ................ G06F 17/30; G06F 17/00
See application file for complete search history.

(56) References Cited

U.S. PATENT DOCUMENTS

| | | | | |
|---|---|---|---|---|
| 6,407,680 B1 * | 6/2002 | Lai et al. | ........................... | 341/50 |
| 6,496,868 B2 * | 12/2002 | Krueger et al. | ................ | 709/247 |
| 7,149,693 B2 * | 12/2006 | Laronne et al. | ............... | 704/270 |
| 7,159,233 B2 * | 1/2007 | Son et al. | ........................ | 725/86 |
| 7,203,692 B2 * | 4/2007 | Tabatabai et al. | ...................... | 1/1 |
| 7,213,076 B2 * | 5/2007 | Bodin et a | ...................... | 709/232 |
| 7,242,324 B2 * | 7/2007 | Lai et al. | ............................ | 341/51 |
| 7,426,537 B2 * | 9/2008 | Lee et al. | ......................... | 709/204 |
| 7,558,825 B2 * | 7/2009 | Bodin et al. | ................... | 709/206 |
| 7,669,121 B2 * | 2/2010 | Kiilerich | ........................ | 715/249 |
| 7,672,955 B2 * | 3/2010 | White | ........................... | 717/100 |
| 7,676,590 B2 * | 3/2010 | Silverman et al. | ............ | 709/231 |
| 7,716,180 B2 * | 5/2010 | Vermeulen et al. | ........... | 707/626 |
| 7,769,819 B2 * | 8/2010 | Lerman et al. | ................. | 709/217 |
| 7,809,802 B2 * | 10/2010 | Lerman et al. | ................. | 709/217 |
| 7,974,313 B2 * | 7/2011 | Kim et al. | ...................... | 370/486 |
| 8,028,094 B2 * | 9/2011 | Sahdra et al. | .................. | 709/246 |
| 8,107,495 B2 * | 1/2012 | Yarlagadda et al. | .......... | 370/467 |
| 8,176,321 B1 * | 5/2012 | Perry et al. | ..................... | 713/167 |
| 8,219,711 B2 * | 7/2012 | Visharam et al. | ............. | 709/246 |
| 8,266,182 B2 * | 9/2012 | Wanigasekara-Mohotti et al. | .............................. | 707/796 |
| 8,301,330 B2 * | 10/2012 | Nielsen | ........................ | 701/29.1 |
| 8,312,079 B2 * | 11/2012 | Newsome et al. | ............. | 709/203 |
| 8,380,786 B2 * | 2/2013 | Hoffert et al. | .................. | 709/203 |
| 8,392,615 B2 * | 3/2013 | Visharam et al. | ............. | 709/246 |
| 8,464,304 B2 * | 6/2013 | Harwell et al. | ................ | 725/115 |
| 8,601,506 B2 * | 12/2013 | Harwell et al. | .................. | 725/32 |
| 8,650,283 B1 * | 2/2014 | Chang et al. | ................... | 709/224 |
| 8,813,245 B1 * | 8/2014 | Corley et al. | .................... | 726/27 |
| 8,898,244 B2 * | 11/2014 | Miglore | ......................... | 709/209 |
| 9,037,674 B2 * | 5/2015 | Hoffert et al. | .................. | 709/217 |
| 9,064,010 B2 * | 6/2015 | Maharajh et al. | ...................... | 1/1 |
| 2004/0166834 A1 * | 8/2004 | Omar et al. | ................. | 455/414.1 |
| 2006/0259588 A1 * | 11/2006 | Lerman et al. | ................. | 709/219 |
| 2006/0259589 A1 * | 11/2006 | Lerman et al. | ................. | 709/219 |
| 2006/0271977 A1 * | 11/2006 | Lerman et al. | .................. | 725/88 |
| 2007/0162487 A1 * | 7/2007 | Frailey | ......................... | 707/102 |
| 2007/0183741 A1 * | 8/2007 | Lerman et al. | ................... | 386/54 |
| 2008/0207182 A1 * | 8/2008 | Maharajh et al. | .......... | 455/414.1 |
| 2009/0119322 A1 * | 5/2009 | Mills et al. | ..................... | 707/101 |
| 2010/0094728 A1 * | 4/2010 | Denning et al. | ................ | 705/27 |
| 2011/0032856 A1 * | 2/2011 | Ozawa | .......................... | 370/310 |

(Continued)

*Primary Examiner* — Farhan Syed

(74) *Attorney, Agent, or Firm* — Robert C. Kowert; Meyertons, Hood, Kivlin, Kowert & Goetzel, P.C.

(57) ABSTRACT

A computer-implemented method for uploading and storing a file. The file is automatically transcoded to the format(s) of registered device(s) associated with an entity. The transcoded files are thus prepared for download and access by the registered devices.

29 Claims, 10 Drawing Sheets

(56) References Cited

U.S. PATENT DOCUMENTS

| | | | |
|---|---|---|---|
| 2011/0072086 A1* | 3/2011 | Newsome et al. | 709/204 |
| 2011/0072096 A1* | 3/2011 | Goldstein et al. | 709/206 |
| 2011/0072106 A1* | 3/2011 | Hoffert et al. | 709/217 |
| 2011/0191320 A1* | 8/2011 | Glover | 707/706 |
| 2012/0084286 A1* | 4/2012 | Hubner et al. | 707/737 |
| 2012/0173650 A1* | 7/2012 | Ye et al. | 709/206 |
| 2012/0192225 A1* | 7/2012 | Harwell et al. | 725/34 |
| 2012/0192239 A1* | 7/2012 | Harwell et al. | 725/109 |
| 2012/0304230 A1* | 11/2012 | Harwell et al. | 725/41 |
| 2012/0304237 A1* | 11/2012 | Harwell et al. | 725/109 |
| 2013/0103786 A1* | 4/2013 | Miglore | 709/217 |
| 2015/0067006 A1* | 3/2015 | Miglore | 707/827 |

* cited by examiner

AUTOMATIC TRANSCODING OF A FILE UPLOADED TO A REMOTE STORAGE SYSTEM

BACKGROUND

Many different computing applications rely on some type of storage medium for persistent storage of various kinds of application data. For example, common office applications and multi-media applications generally use application data of various types and formats, such as documents, spreadsheets, still images, audios and video data, among others. Frequently, such data are stored for repeated access or use on behalf of the owner/user. More recently, such data may be stored remotely, possibly using hardware storage resources that are maintained and operated by third parties.

Very often, the data that is stored by a user may be accessed by that user or authorized guests via a variety of different devices, such as cell phones, tablet computers, laptop computers, or other devices. These devices may require different formats for viewing or use on the particular devices. If such data is stored remotely, often that data may have to be transcoded to an appropriate format so that the data will be usable by the device seeking access.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for managing storage of data so as to provide convenient and fast down download unto different devices. A user may upload data files remotely, and as a data file is uploaded, the data file may be automatically transcoded to one or more formats that are anticipated to be needed for later downloads and/or other access. As part of the techniques described herein, information about devices or services that typically access and download a user's data may be maintained, and data files may be automatically transcoded to match the formats of the devices or services. As an example, all files associated with a particular customer-owned identity and typically accessed via a social network can be automatically transcoded, during or after uploading by the customer-owned identity, to a format that is usable for the social network.

Transcoding may occur as a file is uploaded, may occur later as a background service, and/or at other times, such as when a potential need for transcoded data is detected. In either event, when a user, such as the owner of the data file or an authorized guest, requests access to the file (for example, by requesting download of the file), if the device for which access to the file was requested was known during the initial transcoding process, then the appropriate format may be available for immediate access upon request. Generally, if a need for data to be in a particular format was anticipated, the data in the particular format may be stored in the anticipated format and, therefore, immediately available.

If desired, when a user, such as the owner of the data file or an authorized guest, adds a device or service (such as by registering the device), the desired format for that device or service may be recorded with the system, and files accessible to the user that are of the same file type may be transcoded to the new format so that the new format is available for the new device. Similarly, if the user takes one or more actions that indicate the new format may be useful to the user, files accessible to the user may similarly be transcoded and made accessible to the user. As one example, if it is detected that the user has started purchasing content in a particular format, files in a different format but transcodable to that format may be transcoded so as to be available in the format.

Figure 1:
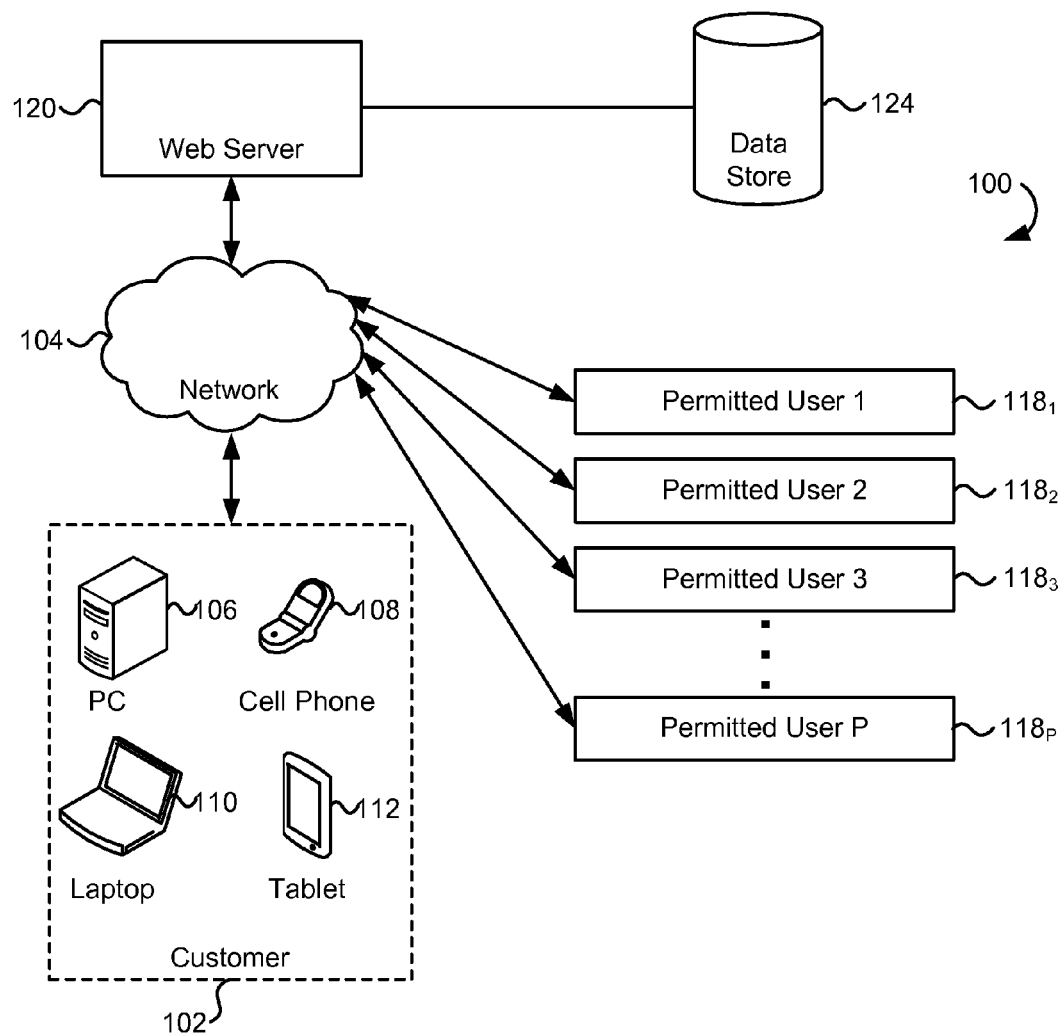
FIG. 1 illustrates an example of an environment for implementing aspects in accordance with various embodiments.

FIG. 1 illustrates an example of an environment 100 for implementing aspects in accordance with various embodiments. The environment 100 shown includes customer-owned identity 102 which, in embodiments, is a user that utilizes appropriate device(s) to send and receive requests, messages, or information over an appropriate network 104, as described below. These devices may be used to upload or download data files via a web server 120 from a data store 124. Examples of such client devices, some of which are shown in FIG. 1, include personal computers 106, cellular phones 108, handheld messaging devices (not shown), laptop computers 110, set-top boxes (not shown), personal data assistants (not shown), electronic book readers (not shown), tablet computers 112, and the like. A device could also be a server or other service. Services include, but are not limited to, social networking sites and other services available via the Internet or other networks.

The network 104 can include any appropriate network, including an intranet, the Internet, a cellular network, a local area network, or any other such network or combination thereof. Components used for such a system can depend at least in part upon the type of network and/or environment selected. Protocols and components for communicating via such a network may include standard existing protocols and components and/or generally any protocols and components suitable for the communication of data. Communication over the network can be enabled by wired or wireless connections, and combinations thereof. In this example, the network includes the Internet, and the environment includes the Web server 120 for receiving requests and serving content in response thereto, although for other networks an alternative device serving a similar purpose could be used as would be apparent to one of ordinary skill in the art. Also, as will be appreciated, although a Web-based environment is used for purposes of explanation, different environments may be used, as appropriate, to implement various embodiments.

The illustrative environment of FIG. 1 includes the data store 124 that can be accessed by the Web server 120. As used herein the term "data store" refers to any device or combination of devices capable of storing, accessing, and retrieving data, which may include any combination and number of data servers, databases, data storage devices, and data storage media, in any standard, distributed, or clustered environment. An exemplary example of a distributed storage system is described in U.S. Pat. No. 7,716,180, entitled "Distributed Storage System with Web Services Client Interface", although other data stores may be used. Further, while shown as directly connected to the Web server 120, the data store may be accessible by the Web server 120 indirectly. Generally, while various components are illustrated herein as being connected to one another, it should be understood that components may be separated by one or more other components.

The Web server 120, while illustrated as a single component, may be a system that includes several application servers, layers, or other elements, processes, and/or components, which may be chained or otherwise configured, and which can interact to perform tasks such as obtaining data from or writing data to the data store 124. To this end, the Web server 120 can include any appropriate hardware and software for integrating with the data store 124 and the customer-owned identity 102 as needed to provide the features described herein. The handling of all requests and responses, as well as the delivery of content between the customer-owned identity 102 and the data store 124, can be handled by the Web server 120. It should be understood that Web and application servers are not required and are merely example components, as structured code discussed herein can be executed on any appropriate device or host machine as discussed elsewhere herein. Further, the environment can be architected in such a way that features herein are provided as a service to which a user or application can subscribe.

In accordance with embodiments, the web server 120 is configured to perform various functions described herein, such as managing uploading of data from one or more devices of the customer-owned identity and automated storage of one or more appropriate formats of the data in the data store 124. The appropriate format of data may then be accessed and downloaded from the data store 124, via the web server 120, by one or more of the devices (e.g., 106, 108, 110, 112, or the like) owned by the customer-owned identity 102.

In addition to the customer-owned identity 102, one or more permitted users 118$_1$, 118$_2$, 118$_3$ . . . 118$_p$ may be provided access to, via the web server 120, data owned or controlled by the customer-owned identity 102. These permitted users 118 are granted access by the customer owned identity, and may obtain such access through an authorized transaction through the web server 120 via one or more devices. The devices utilized by the permitted users 118 may be one or more of the types of devices described above with respect to the customer-owned identity, or other appropriate device(s) to send and receive requests, messages, or information over the network 104. Access may be granted to the permitted users 118 in various ways. For example, the customer-owned identity 102 may provide credentials for the permitted users 118 to access content. As another example, the customer-owned identity may explicitly specify identities of permitted users. As yet another example, permitted users may be defined based at least in part on qualities of the permitted users. For instance, permitted users 118 may be users of a social networking service and/or users that have accounts with the social networking service that are directly linked to an account of the customer-owned identity 102.

Figure 2:
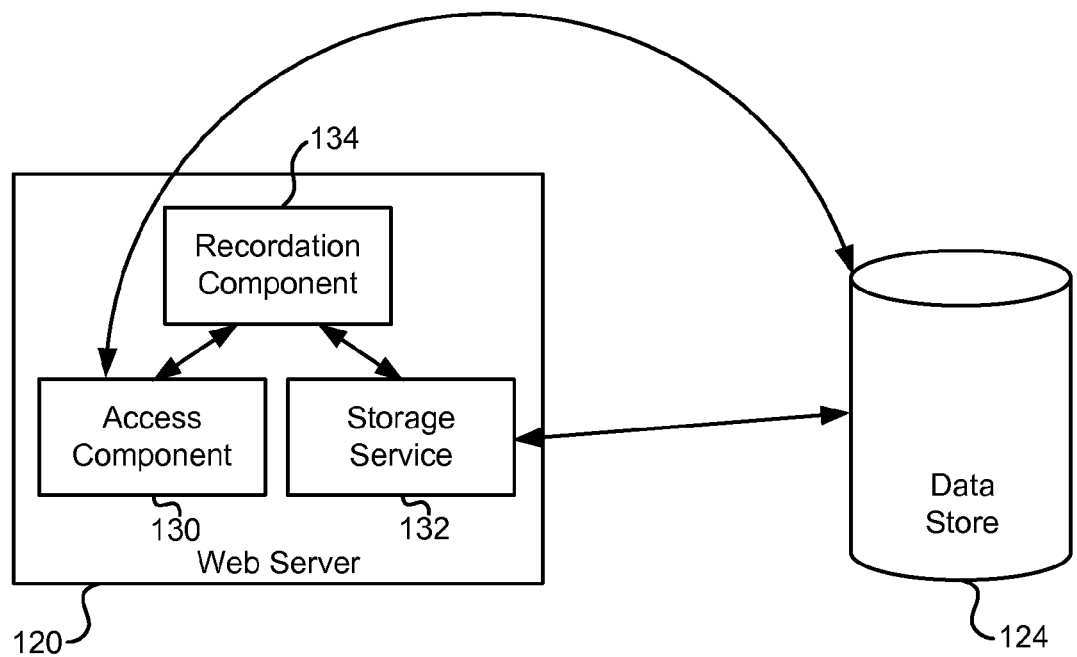
FIG. 2 schematically illustrates a plurality of modules that may carry out features of a web server in accordance with embodiments.

FIG. 2 schematically illustrates a plurality of modules that may carry out features of the web server 120 in accordance with embodiments. The modules may be software modules, hardware modules, or a combination thereof. If the modules are software modules, the modules will be embodied on a computer-readable medium and processed by one or more processors in any of the devices described herein.

The first module is an access component 130. The access component 130 is utilized by the customer-owned identity 102 or one of the permitted users 118 to access (e.g., upload or download) data files from the data store 124. The access component 130 may be configured to selectively allow access by requiring user authentication. The access component 130 may also interact with other components that, for the purpose of clarity, are not explicitly shown. For instance, the access component may interact with an authentication system, a customer-relationship management system, a payment system, and/or any other system that may be involved in controlling access to data files.

The second module is a storage service 132. The storage service 132 is utilized to upload, maintain, and store data files in the data store 124. As part of that process, as briefly described above and as is described in more detail below, the storage service module 132 can transcode a data file into one or more different formats for storing in the data store 124. Transcoding is the direct digital-to-digital data conversion of one encoding to another, such as for movie data files or audio files. This is usually done in cases where a target device does not support the format or has limited storage capacity that mandates a reduced file size, or to convert incompatible or obsolete data to a better-supported or modern format. In embodiments, data formats are transcoded when uploaded, or after uploading in a background process. The data format(s) are thus available for immediate download when needed. It should be noted that, unless otherwise clear from context, transcoding is intended to include modifications of a data file that do not necessarily change the file type. For instance, transcoding may, in some instances, include reducing the bitrate of a Moving Picture Experts Group (MPEG) audio layer III (MP3) file so as to have corresponding content available with a smaller file size. Similarly, a Joint Photographic Experts Group (JPEG) file may be downsampled to a smaller file size, as may movie files and other content. Of course, as noted, transcoding may also include changing the way a data file is encoded, such as by changing a Windows Media Audio (WMA) file to an MP3 file so that the file is usable with devices that do not support WMA files.

The third module is a recordation component 134. The recordation component 134 maintains information regarding a device or devices that the customer-owned identity 102 may utilize to upload or access data in the data store 124. Similarly, the recordation component 134 maintains information regarding devices and/or formats utilized by devices owned by the permitted users 118. The information maintained by the recordation component 134 may be obtained in various ways. For example, the Web server may utilize various device detection routines to enable automatic recordation of the device when the device connects to the web server. As another example, a registration process may be utilized wherein users specify devices and/or device types. As yet another example, the Web server may be able to access one or more data stores that store records of devices that users have purchased. For instance, the Web server may be associated with an organization that sells devices as part of their business. Generally, the information maintained by the recordation component may be obtained in any suitable manner.

Figure 3:
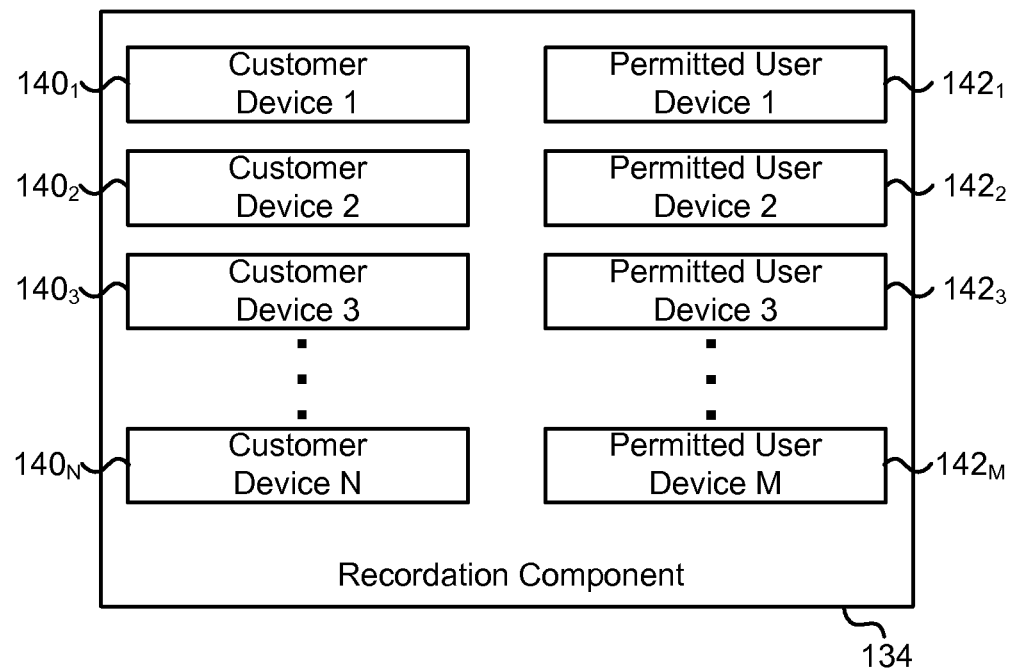
FIG. 3 schematically illustrates a representation of information that may be maintained by the recordation component.

FIG. 3 schematically illustrates a representation of information that may be maintained by the recordation component 134. As an example, the recordation component maintains information regarding registered devices of the customer-owned identity 102 and permitted users 118, described above in connection with FIG. 1. As indicated above, the permitted users had been granted explicit permission to download or otherwise access data associated with the customer-owned identity 102 and maintained by the data store 124. For example, permitted users 118 may be users of a social networking service and/or users that have accounts with the social networking service that are linked to an account of the customer-owned identity 102. Each of the permitted users may have one or more devices or services, information for which is maintained by the recordation component 134.

In the example shown in FIG. 3, the information included in the recordation component 134 includes devices $140_1$, $140_2$, $140_3$, ... $140_N$ that are devices owned by the customer-owned identity 102 and utilized to access (e.g., upload or download) data from the data store 124. Similarly, information regarding devices $142_1$, $142_2$, $142_3$, ... $142_M$ of permitted users 118 may be maintained by the recordation component 134. The recordation component 134 may associate a preferred format of data for the device. For example, if the device is a mobile phone, the format for an image may be 480×640 pixel JPEG image. In addition, the information maintained by the recordation component may include multiple format sets for a single device. For example, the desktop computer 106 (shown in FIG. 1) may access and download an image from the data store 124 for editing, and desire a large or raw data format image. The same desktop computer 106 may request to download a lower resolution image for posting to a social media site, for example. These multiple formats for a single device can be maintained by the recordation component. To this end, though represented as "devices" in the recordation component, the devices may be services, such as a social networking service, through which a permitted user is connected to the customer-owned identity. Similarly, "devices" is used throughout the drawings, and could mean a device or service. In addition, as described below, information may be maintained regarding a common format that may be utilized by multiple different devices. If so, the information maintained by the recordation component 134 for a particular device or service may include information about the common format.

Information regarding a format for a device or service may be obtained by the recordation component 134 through metadata sent from a request by the device, or through a lookup table available on the recordation component 134 or via the network 104. A single device or service may have a preferred format but may be able to use many formats of a file type.

Figure 4:
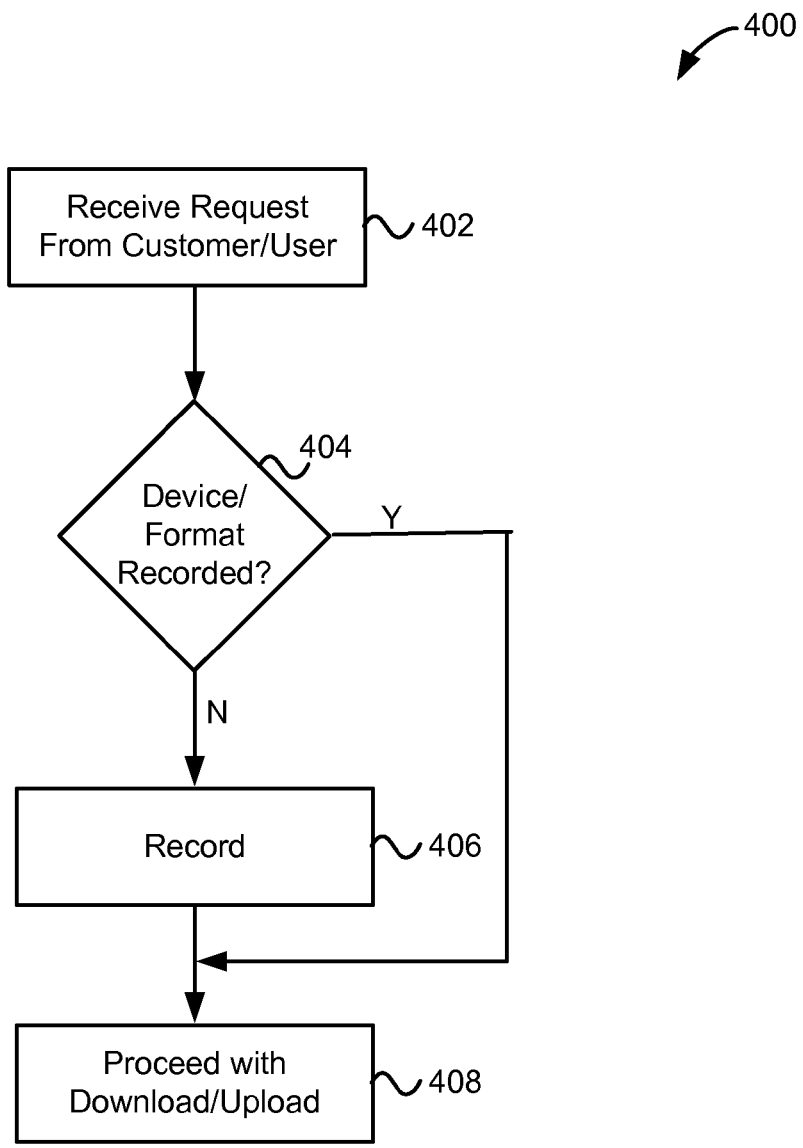
FIG. 4 shows a process that may be performed as a device requests an upload or a download from a data store in accordance with embodiments.

In accordance with embodiments, the recordation component 134 records information about the device or service as a result of a customer or a user requesting download or upload of a file from the data store 124. FIG. 4 shows a process 400 that may be performed as a device or service requests an upload or a download from the data store 124. The process 400 may, for example, be performed by the Web server 120 described above or any suitable device. Beginning at 402, a request is received from the customer or user for download or upload of a file. The request may be an electronic request made by a device or service of the customer or user over a communications network, such as the Internet. At 404, a determination is made whether the device or service is recorded with the recordation component 134. If not, then 404 branches to 406, where the device or service is recorded and then proceeds to step 408 where the download or upload proceeds, such as described below. If so, then 404 branches directly to step 408, where the download or upload process proceeds, as described below. It should be noted that, while downloads and uploads are used for the purpose of illustration, other types of data access are considered as being within the scope of the present disclosure. For example, video and/or audio content may be streamed to a device of the user that may not store a complete copy of the content and the process 400 can be adapted accordingly.

Some or all of the process 400 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

Figure 5:
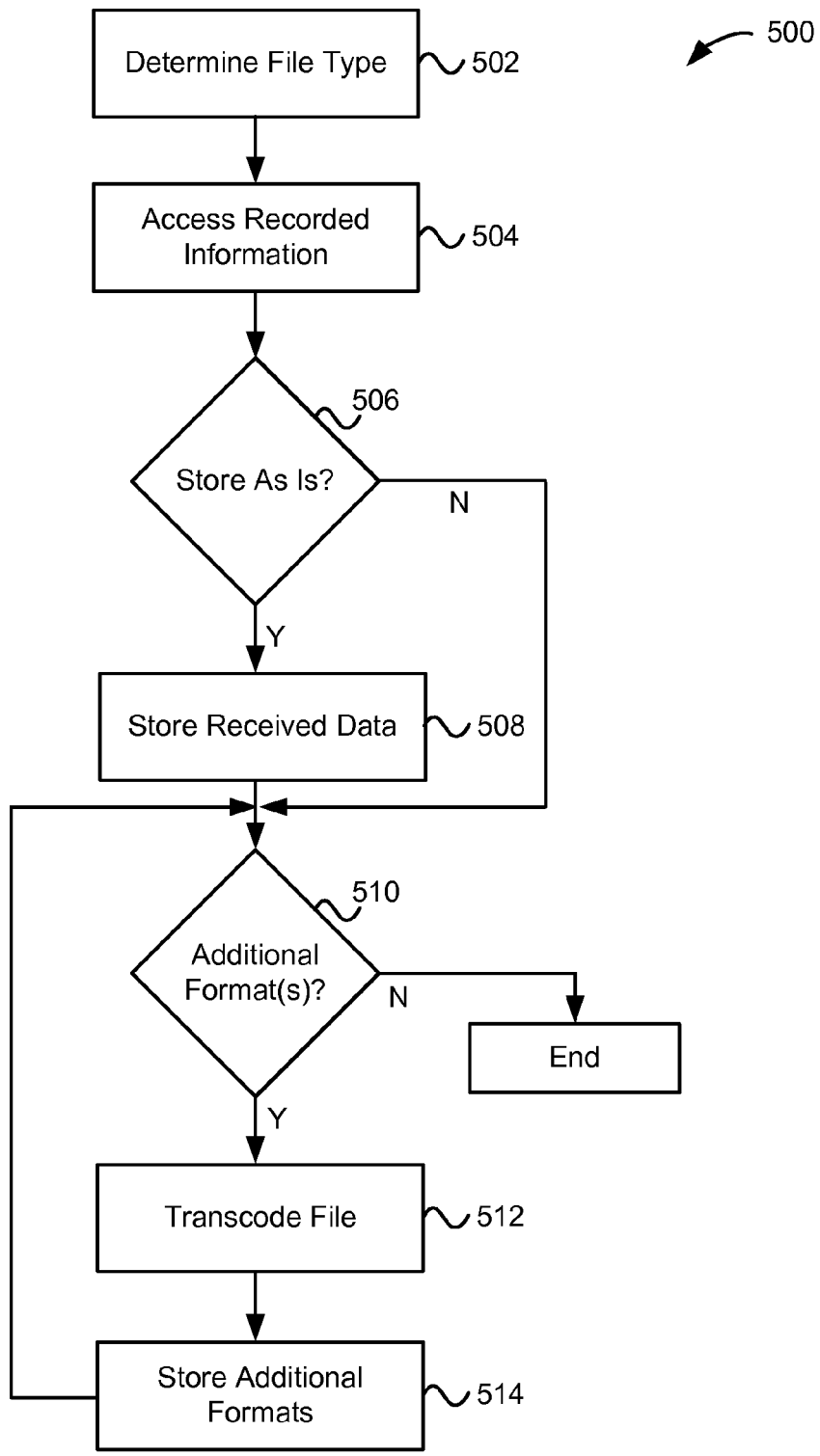
FIG. 5 shows a process for uploading and transcoding a data file in according with embodiments.

In accordance with embodiments, as shown by process 500 in FIG. 5, when the access component 130, described above in connection with FIG. 2, uploads a data file from a customer-owned identity 102, the data file is stored in the data store 124 in accordance with information in the recordation component 134. In embodiments, the recordation component 134 can maintain information regarding formats and may group information in accordance with file types. For example, image file types can be associated with one another, document types can be associated with one another, and so forth. In accordance with embodiments and described in conjunction with FIGS. 5 and 7, when uploading a file into the data store 124, the storage service 132 determines what formats are stored in the recordation component 134 with the particular file type, and then stores versions of the file in some or all of the formats associated with the particular file type. In addition, a common file format may be determined that may work for multiple devices, and that common format may be used instead of two or more formats associated with a particular file type. The common format may not be ideal for each of the devices, to save the cost of additional storage and multiple transcodings, a common format could be determined and stored for later downloading the use by multiple devices.

Figure 7:
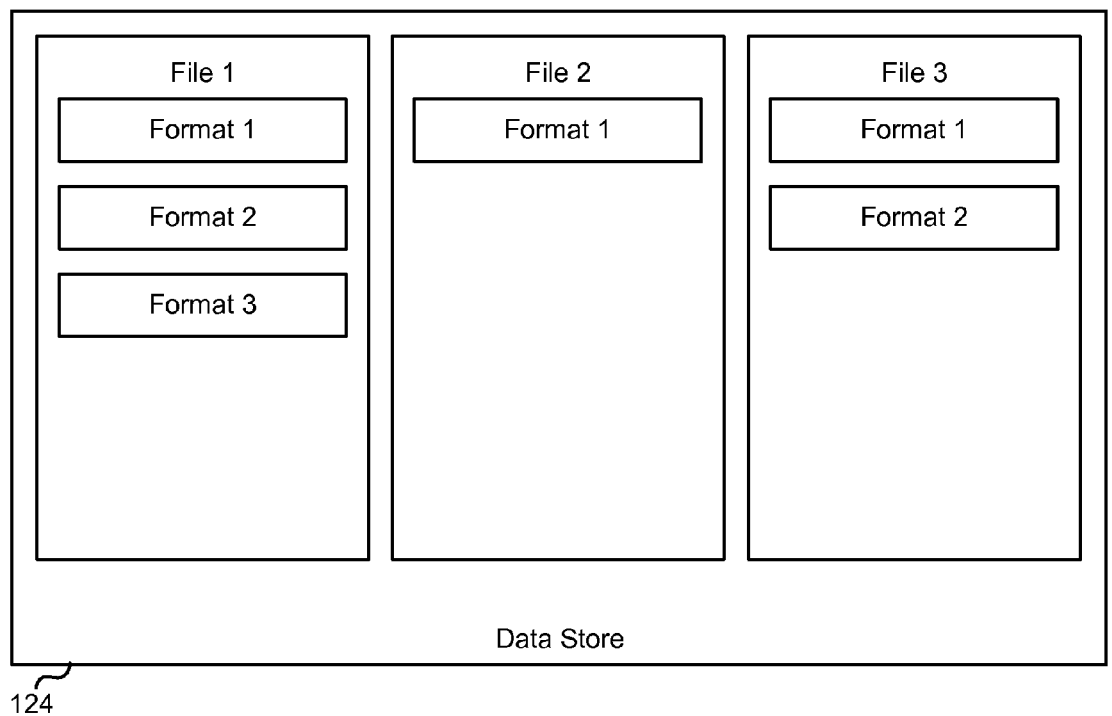
FIG. 7 shows a representation of storage of files within a data store in accordance with embodiments.

Beginning at 502, the file type for a file being uploaded is determined, for example by the storage service 132. That file type may be, for instance, an image file. At 504, the recordation information is accessed by the storage service 132 from the recordation component 134 for that file type. At 506-512 (described below), the storage service 132 transcodes and stores the formats associated with the file type within the recordation information in the recordation component 134. The formats are then stored in the data store 124 by the storage service 132. A representation of storage of files is shown in FIG. 7, where representations of file formats stored for three different files are shown. In the embodiment shown in the drawing, file 1 includes three different formats, file 2 includes a single format, and file 3 includes two formats.

The number of formats stored for a particular file type is determined based upon the information maintained in the recordation component 134. However, not necessarily all formats stored for a particular file type within the recordation component are transcoded and stored for each file of the file type. As discussed above, a common format can be determined and can be substituted for two or more formats in the recordation component 134. A neutral format can be established that is easily transcoded on demand to be usable with multiple devices. In embodiments, customers can specify what formats are to be stored. For example, a customer may select to store a received image format and additional smaller images for fast download. The customer may be provided different options and different costs for storing such options. For example, storing larger files may cost more than storing smaller image files. Similarly, the number of file formats that are stored can be limited or can be associated with a particular fee structure.

Nonlimiting examples of file types that can be stored are videos, documents, and audio files. For video files, a digital video (dv) file may be uploaded, and may be normalized to an MPEG-4 (MP4). The storage service 132 can be configured to store both the dv video and the MP4, or just the MP4. In this example, the MP4 may be sufficient for most needs of the customer-owned identity 102, and only this format could be stored. MP4 is used on many devices, and can be directly downloaded or easily transcoded upon a download request. Similarly, raw images may be stored as jpegs, and both or only the jpeg can be stored. A document can be transcoded into Portable Document Format (pdf), and both the document and the pdf document can be stored. The access component 130 and the recordation component 134 may maintain information regarding customer usage and may suggest or automatically use a particular format based at least in part on that usage. For example, if the customer regularly uploads large image files and accesses those image files only for use on social networking websites, then smaller jpeg files may be stored in the data store 124. A variety of different options can be set automatically by the web server 120 or could be made available as options to the customer-owned entity 102. Thus, the formats provided by the recordation component are not necessarily all preferred formats for all devices registered with the recordation component 134. As another example, the recordation component 134 can maintain bitrate information regarding requests for a particular file type for a customer-owned identity or a permitted user, and may store and provide a bitrate format that matches a typical or average bitrate.

Returning now to FIG. 5, once the recordation information is obtained from the recordation component 134, at 506 (FIG. 5), a determination is made whether the data is to be stored in the format received by the customer-owned entity 102. If so, 506 branches to 508, where the received data is stored, for example, as format 1 of file 1 in FIG. 7. This format is stored by the storage service 132 into the data store 124. If the data is not to be stored in the received format, then the process skips directly to 510, where a determination is made whether there are additional formats to be stored. If not, then the process ends. If so, then 510 branches to 512, where the storage service 132 transcodes the file into the desired format. At 514, the desired format is stored, for example, as format 2 of file 1 in FIG. 7. The process then branches back to 510, where a determination is made whether additional formats are to being stored. If so, 510 branches to 512, where the file is transcoded again, for example, to format 3 for file 1 in FIG. 6. The process then proceeds to 514, where the storage service 132 stores the additional format. When all formats have been transcoded and stored, the process may end.

From the above example, the recordation information maintained by the recordation component 134 can define one or more formats, and these formats may or may not include received data as uploaded from a device. However, because the file types that are chosen are selected from the recordation information, the file formats that are stored by the storage service 132 match the devices or services that are stored for a particular customer-owned identity 102. Thus, when one of these devices attempts a download or other access of a file, a very fast download may occur without having to transcode the data for the device. Also, if bitrate information is maintained by the recordation component, that information may be used to make an educated decision regarding a bitrate to provide to a user. As an example, requests by a particular user can be maintained by the recordation information, and an average or typical (e.g., most requested) bitrate format can be maintained. As a result of a request for streaming of a file by the user, the average or typical bitrate can be provided. The average can be utilized over multiple users, where an average for the users is kept, and a new user is initially provided the average or typical bitrate for the group of users. In any event, faster provisioning for users is provided.

Figure 6:
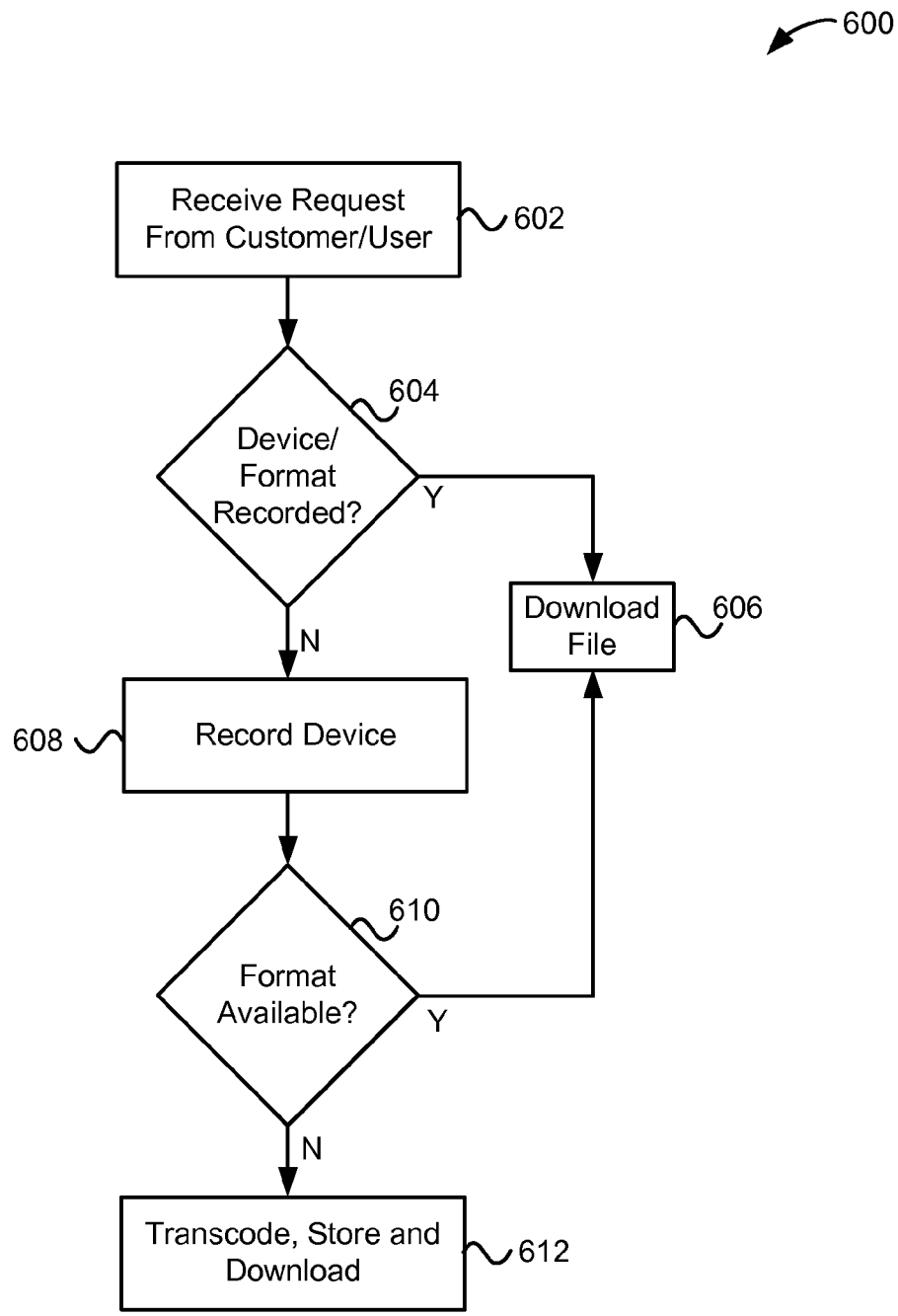
FIG. 6 shows process of processing a download request in accordance with embodiments.

For example, as shown in the process 600 in FIG. 6, at 602 a request may be received by the access component 130 from the customer-owned identity 102 or a permitted user 118 for the download of a file. The request may be an electronic request from a device or service of the customer-owned identity 102 or the permitted user. The request may not identify the particular file to be downloaded, but may, for example, refer to an identifier of a group of files encoding the same content in multiple formats. For instance, the request may specify an identifier of content (such as an identifier of an audio track) and the process 600 may be used to provide an appropriate file that encodes the content. If the device and format for the device are stored with the recorded information, then 604 branches to 606 where the file is downloaded in the desired format to match the device. In this particular example, if the format matches the particular format that is used by the device, no transcoding or transformation of the data is needed; the proper format of the file for the requesting device is simply accessed and downloaded directly to the device.

If the device or service is not maintained in the recorded information, then 604 branches to 608, where information about the device is recorded, such as described above. At 610, a determination is made whether the format for the newly registered device or service is available for download or other access on the data store 124. If not, then, as part of 612, the storage component 132 transcodes the file format that is available in the data store 124 to a format that works for the newly registered device or service. That transcoded file may then, as part of 612, be stored in the data store 124 for later download for similar devices or services. In any event, the transcoded file may, as part of 612, be downloaded or otherwise accessed (e.g., streamed). If the format is available, then 610 branches to 606, where that format is then downloaded (e.g. provided to the device or service that submitted the request). Because the device is now registered, 608 and 610 may be skipped in the future, and direct download may occur for this device and file in the future.

Figure 8:
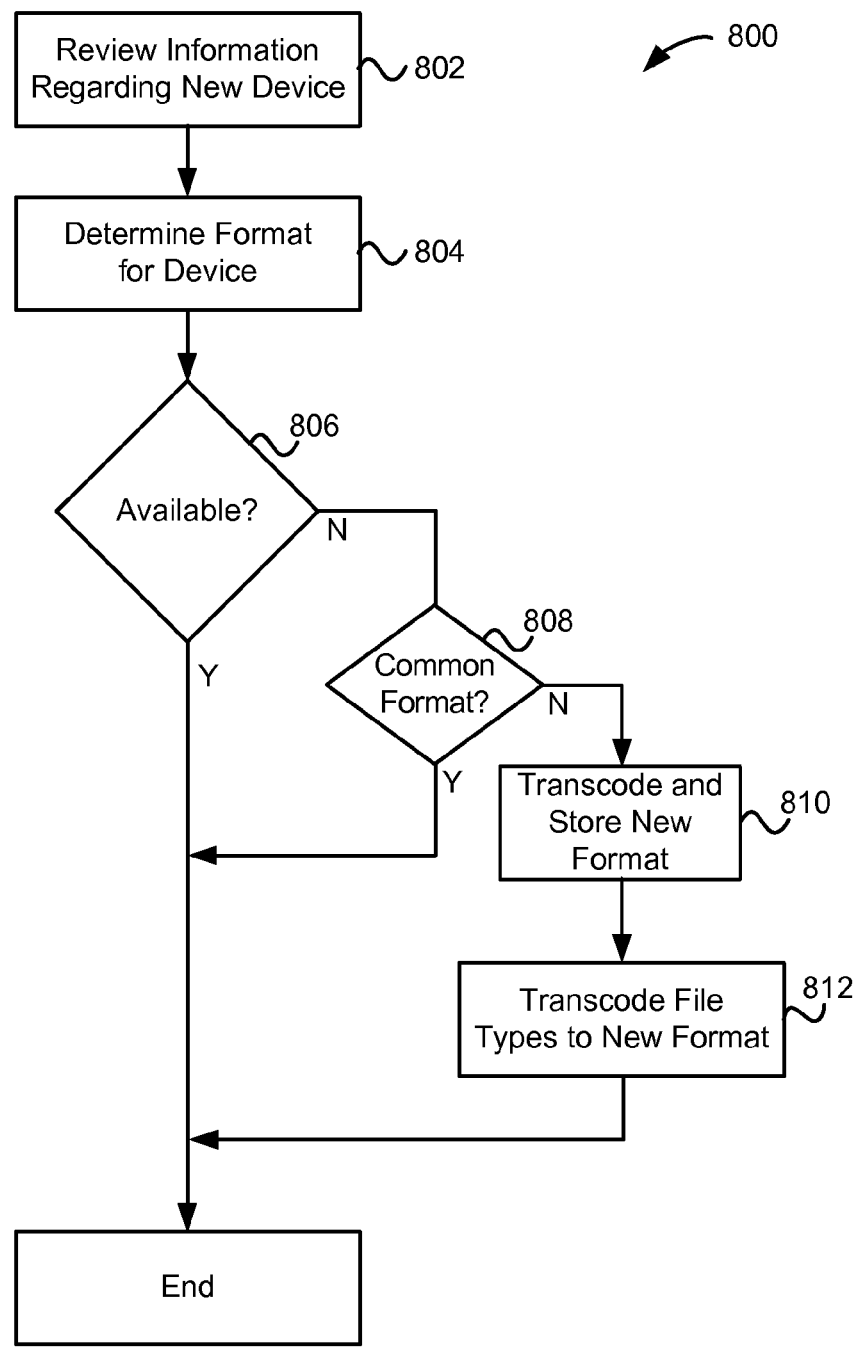
FIG. 8 shows a process of handling recordation of a new device in accordance with embodiments.

In embodiments, when a new device or service is recorded with the recordation component 134, a determination can be made if existing formats in the data store 124 are already available for the device or service, or whether existing files in the data store 124 should be transcoded to a new format type for use by the newly registered device or service. For example, as shown in the process 800 in FIG. 8, at 802, information regarding a new device or service is received for example by the access component 130 or the storage component 132. Information about a new device or service may be received as a result of the device requesting an upload or download of a file, or through a separate recordation process of the device. At 804, a desired format for the device is determined, for example by information provided by the device or through information available via the network 104. At 806, a determination is made whether the desired file format for the device is available. If so, then the process ends. However, if not, then a determination can be made whether a common format is available at 808. As stated above, a common format type can be a format that works on multiple different devices, but may not necessarily be the preferred format for each of the devices. If a common format is available and preferences are set so that a common format may be used, then the process ends. If neither the desired format nor a common format is available, the 808 branches to 810 where, if recordation of the device was part of a request for a file, the file is transcoded, stored, and provided to the device. Information about the device is stored by the recordation component 134. If the device or service is only being recorded with the system and is not requesting download, then 810 is skipped, and information about the device or service is stored by the recordation component 134.

After the new format is registered by the recordation component, at 812, files in the data store 124 having file types associated with the newly registered device or service are transcoded to the new format and stored in the data store 124. This process may be a background process and may occur for a subset of all files associated with a particular file type.

For example, a customer-owned identity may purchase a new tablet 112. Prior to the purchase, the only devices registered with the recordation component 134 were the PC 106, the laptop 110, and the cell phone 108. For images, the only formats that were registered for these three devices were received images (for the PC 106 and the laptop 110), and low resolution jpegs for the phone 108. Although the low resolution images may work as a common format for the tablet 112, through the recordation process of FIG. 8, a determination may be made that higher resolution jpegs are desired for the tablet. Thus, a new format for the image file type may be stored in the recordation component for the tablet 112. As a result of adding this new format, some or all images stored for the customer-owned identity can be transcoded for immediate download by the tablet 118. This transcoding may occur as a background process, with the new format later being available for the tablet 118.

Figure 9:
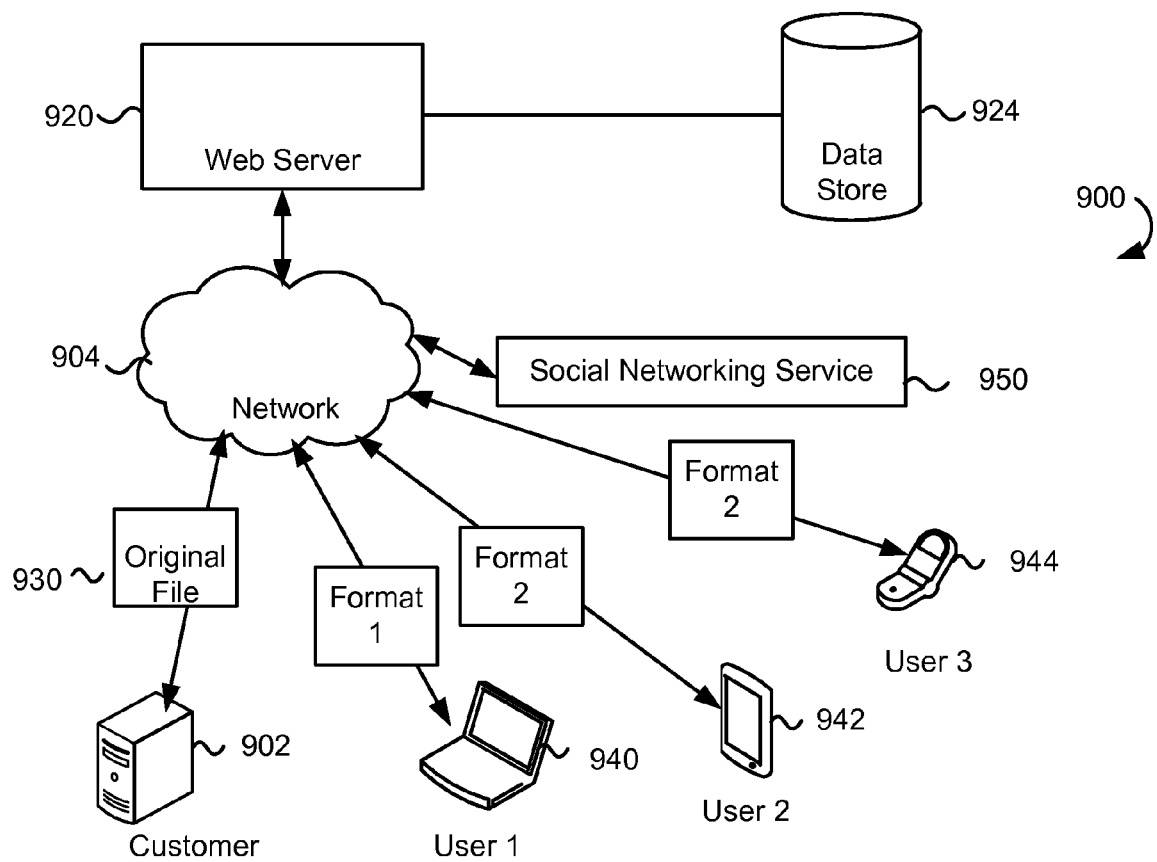
FIG. 9 shows a representation of implementation of aspects in a social networking environment in accordance with embodiments.

FIG. 9 shows a representation of implementation of aspects in a social networking environment 900 in accordance with embodiments. The environment 900 includes a Web Server 920, such as the Web Server 120, and a data store 924, such as the data store 124. The Web Server 920 is connected to a Network 904, such as the Network 104. A customer-owned identity 902, such as the customer-owned identity 102, uploads files, such as an image file 930, to the data store 924. Users of user devices 940, 942, and 944 are members of a social networking service 950 and are friends or are otherwise linked with the customer 902. Through this affiliation, the users are permitted users, such as the permitted users 118, for the customer's files. The social networking service can be recorded with the Web Server 920 for the customer 902. Thus, the files of the customer, such as the file 930, can be automatically uploaded in a format that is ideal for use on the social networking site. The social networking service 950 may request, as example, a file to be automatically transcoded to a JPEG file for use, and/or can request multiple different formats for each of the user devices 940, 942, and 944. Examples are shown where Format 1 is provided to User 1, and Format 2 is provided to Users 2 and 3.

As another feature, the format of files provided to a user may be determined based upon usual access, such as slow or fast bitrates. For example, the User 2 may regularly access video files of the customer via the social networking service 950 using a mobile network. Because the bitrate of a mobile network is typically slower than wireless services, information can be stored regarding slow bitrates to User 2. Based upon the bitrates used by User 2, the Format 2 is stored in the data store, and is selected for streaming to the User 2. A variety of options are available for the environment 900, but in general, automatic transcoding to match users in the social networking service 950 can occur at upload, and a preferred format can be available for users on download or other access.

Figure 10:
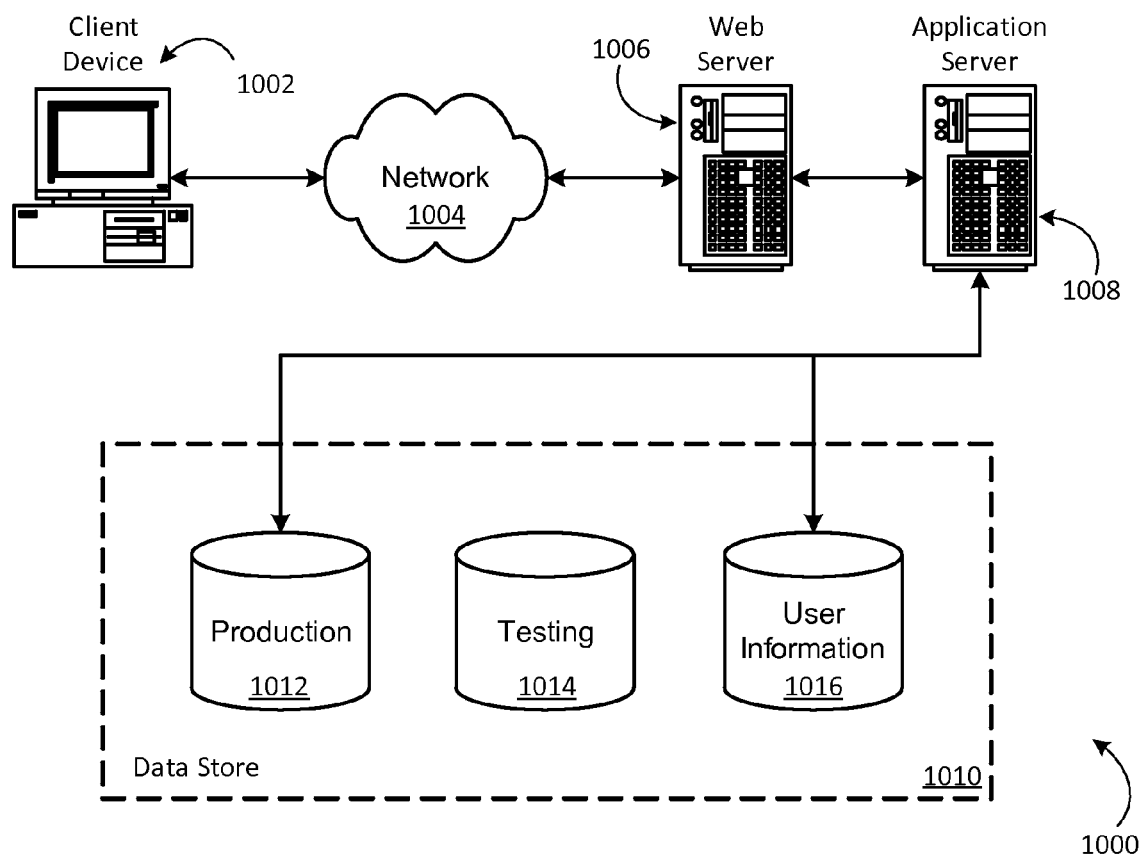
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases, or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, servers operating in accordance with a Java® standard, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM® corporations.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for uploading and storing a file, comprising:
    under control of one or more computer systems configured with executable instructions,
        recording usage of one or more file types by users, comprising recording usage of one or more formats for a particular file type of the one or more file types by the users, wherein the users are connected to a customer as permitted users via a social networking service;
        maintaining format information regarding the one or more formats for the particular file type, comprising:
            identifying at least one of the one or more formats as one or more preferred formats for the particular file type of the users based at least in part on the recorded usage of the users; and
            associating the one or more preferred formats with a customer-owned identity of the customer;
        receiving a request from a customer device associated with the customer to upload a file having the particular file type, wherein the file does not have one of the one or more preferred formats for the particular file type;
        responsive to the request, transcoding the file in accordance with the format information associated with the customer-owned identity to form a transcoded file, the transcoded file having one of the one or more preferred formats;
        storing the transcoded file and the uploaded file in a data store and associating the transcoded file with the customer-owned identity; and
        responsive to a subsequent request for the file from at least one of the users or from the customer, returning the transcoded file.

2. The computer-implemented method of claim 1, further comprising:
    receiving information about a new user connecting to the customer-owned identity via the social networking service;
    adding information about a new format of the file type for the new user to the format information;
    responsive to receiving the information about the new user connecting to the customer-owned identity, transcoding at least one of the transcoded file and the file to form a new transcoded file having the new format of the file type; and
    storing the new transcoded file in the data store with the uploaded file and the transcoded file and associating the new transcoded file with the customer-owned identity.

3. The computer-implemented method of claim 1, wherein returning the transcoded file comprises streaming the file to the at least one of the users, and wherein the format of the file for the at least one of the users comprises an average or typical bitrate for the at least one of the users.

4. A computer-implemented method for uploading and storing a file, comprising:
under control of one or more computer systems configured with executable instructions,
recording registered or permitted usage of one or more file types by at least one of devices or services associated with a customer-owned identity, comprising recording usage of one or more formats for a particular file type of the one or more file types by the at least one of devices or services;
maintaining format information regarding the one or more formats for the particular file type, comprising:
identifying at least one of the one or more formats as one or more preferred formats for the particular file type of the customer-owned identity based at least in part on the recorded registered or permitted usage; and
associating the one or more preferred formats with the customer-owned identity;
receiving a request from a customer device associated with the customer-owned identity to upload a file having the particular file type, wherein the file does not have one of the one or more preferred formats for the particular file type;
responsive to the request, transcoding the file in accordance with the format information associated with the customer-owned identity to form at least one transcoded file, the at least one transcoded file having at least one of the one or more preferred formats;
responsive to the transcoding, storing the at least one transcoded file and the file in a data store and associating the at least one transcoded file with the customer-owned identity; and
responsive to a subsequent request associated with the customer-owned identity, returning the at least one transcoded file without further transcoding.

5. The computer-implemented method of claim 4, wherein the transcoding comprises forming at least two transcoded files, wherein the storing comprises storing the at least two transcoded files, and wherein the associating the at least one transcoded file with the customer-owned identity comprises associating at least two transcoded files with the customer-owned identity.

6. The computer-implemented method of claim 4, further comprising:
receiving a request for the file from at least one of a device or a service associated with the customer-owned identity;
accessing the format information to determine a particular preferred format of the file for the at least one of the device or the service; and
providing one of the at least one transcoded files to the at least one of the device or the service, wherein the one of the at least one transcoded files has the particular preferred format.

7. The computer-implemented method of claim 4, further comprising:
registering at least one of a new device or a new service associated with the customer-owned identity;
adding information about a new preferred format for the file type for the at least one of the new device or the new service to the format information;
responsive to registering the at least one of the new device or the new service, transcoding at least one of the at least one transcoded file and the file to form a new transcoded file, wherein the new transcoded file has the new preferred format; and
storing the new transcoded file in the data store with the uploaded file and the at least one transcoded file and associating the new transcoded file with the customer-owned identity.

8. The computer-implemented method of claim 4, wherein the one or more preferred formats for the file type comprise a common format associated with a plurality of devices.

9. The computer-implemented method of claim 4, wherein the file is stored as part of the upload.

10. The computer-implemented method of claim 4, wherein returning the at least one transcoded file comprises streaming the at least one transcoded file to a user, and wherein the format of the at least one transcoded file for the user is based on an average or typical bitrate for the user.

11. The computer-implemented method of claim 4, wherein the at least one of the devices or services are associated with the customer-owned identity via a social networking service.

12. A computer-implemented method for uploading and storing a file, comprising:
under control of one or more computer systems configured with executable instructions,
receiving a request, from a customer device or a permitted user device, including information identifying a file of a customer-owned identity, the file having a particular file type and a particular format;
responsive to the request, accessing information regarding one or more formats for the particular file type, the one or more formats being associated with the customer-owned identity and being determined based at least in part on recoded registered or permitted usage of the one or more formats for the particular file type associated with the customer-owned identity, wherein the particular format is not one of the one or more formats;
responsive to the accessing, transcoding the file to form at least one transcoded file, wherein the at least one transcoded file has the particular format;
responsive to the transcoding,
storing the at least one transcoded file in a data store with the file; and
associating the at least one transcoded file with the customer-owned identity, comprising adding the particular format to the one or more formats; and
responsive to a subsequent request associated with the customer-owned identity, providing the at least one transcoded file without further transcoding.

13. The computer-implemented method of claim 12, further comprising:
receiving a request for the file from a device associated with the customer-owned identity;
accessing the information regarding the one or more formats to determine a preferred format of the file for the device; and
providing one of the at least one transcoded files to the device, wherein the one of the one or more formats has the preferred format.

14. The computer-implemented method of claim 13, further comprising storing information about the device and the preferred format and associating the information about the device and the preferred format with the customer-owned identity.

15. The computer-implemented method of claim 12, further comprising recording usage of the one or more formats for the particular file type by one or more devices associated with the customer-owned identity.

16. The computer-implemented method of claim 12, wherein the file is not stored as part of the upload.

17. A computer system for enabling upload and storage of a file, comprising:
one or more processors; and
memory, including instructions executable by the one or more processors to cause the computer system to at least:
record registered or permitted usage of one or more file types by a second device associated with a customer-owned identity, comprising recording usage of one or more formats for a particular file type of the one or more file types by the second device;
identify at least one of the one or more formats as a preferred format for the particular file type for the second device based at least in part on the recorded registered or permitted usage of the second device;
receive, from a first device associated with the customer-owned identity, a request to upload a file having the particular file type;
responsive to the request, access information associated with the customer-owned identity about the preferred format of the particular file type for the second device;
responsive to the access, transcode the file to form a transcoded file, the transcoded file having the preferred format; and
responsive to the transcoding, store the transcoded file in a data store with the file and associate the transcoded file with the customer-owned identity; and
responsive to a subsequent request for the file associated with the customer-owned identity, provide the transcoded file without further transcoding.

18. The computer system of claim 17, wherein the instructions, when executed by the one or more processors, cause the one or more processors to:
receive a request for the file from the second device; and
provide the transcoded file in response to the request.

19. The computer system of claim 17, wherein the preferred format is common to the first device and the second device.

20. One or more computer-readable storage media having collectively stored thereon executable instructions that, when executed by one or more processors of a computer system, cause the computer system to at least:
record registered or permitted usage of one or more file types by a plurality of devices associated with a customer-owned identity, comprising recording usage of one or more formats for a particular file type of the one or more file types by at least one of the plurality of devices;
receive a request from a particular device associated with the customer-owned identity for a particular file a having the particular file type, the particular file being a customer device or a permitted user device associated with the customer-owned identity;
responsive to the request,
determine a particular format supported by the particular device; and
identify the one or more formats available for the particular file;
determine whether the particular format is included in the one or more formats available for the particular file;
when the particular format is determined to be included in the one or more formats, provide content encoded according to the particular format to the particular device, the content having been encoded according to the particular format prior to receiving the request;
when the particular format is determined not to be included in the one or more formats, transcode the particular file into a transcoded file having the particular file type, the transcoded file comprising content encoded according to the particular format; and
responsive to the transcoding, store the transcoded file in a data store and associate the transcoded file with the customer-owned identity; and
responsive to identifying the particular format from a subsequent request associated with the customer-owned identity, providing the transcoded file without further transcoding.

21. The computer-readable storage media of claim 20, wherein the request comprises a request for download of the particular file.

22. The computer-readable storage media of claim 20, wherein the instructions, when executed by the one or more processors, further cause the computer system to register the particular device with the customer-owned identity in response to the request.

23. The computer-readable storage media of claim 20, wherein the instructions, when executed by the one or more processors, further cause the computer system to transcode at least one other file associated with the customer-owned identity and having the particular file type, according to the particular format.

24. The computer-readable storage media of claim 20, wherein data store includes transcoded files corresponding to each of the plurality of devices.

25. The computer-readable storage media of claim 24, wherein each of the transcoded files corresponding to each of the plurality of devices associated with the customer-owned identity are based at least in part on the particular file.

26. The computer-readable storage media of claim 25, wherein each of the transcoded files corresponding to each of the plurality of devices associated with the customer-owned identity are transcoded and stored in the data store responsive to corresponding requests from each of the plurality of devices such that, responsive to subsequent requests from the plurality of devices, the corresponding transcoded file is provided without further transcoding.

27. The computer-readable storage media of claim 20, wherein the request from the particular device comprises a request to upload the particular file to the data store and the subsequent request comprises a request to access content encoded by the particular file.

28. The computer-readable storage media of claim 20, wherein the executable instructions further cause the computer system at least to transcode the particular file into a different file having a neutral format for further transcoding and storing the different file in the data store with the particular file and the transcoded file.

29. The computer system of claim 17, wherein the instructions, when executed by the one or more processors, further cause the computer system to:
transcode the file into a third file having a neutral format for further transcoding, the neutral format being determined based at least in part on the recorded registered or permitted usage associated with the customer-owned identity; and
store the third file in the data store with the file and the transcoded file.

* * * * *